3,224,832
CALCIUM BOROHYDRIDE PRODUCTION
Richard K. Pearson, Zelienople, Pa., assignor to Callery Chemical Company, Pittsburgh, Pa., a corporation of Pennsylvania
No Drawing. Filed July 31, 1953, Ser. No. 371,793
3 Claims. (Cl. 23—14)

This invention relates to calcium borohydride and to a method of making it.

By analogy to other metallic borohydrides, calcium borohydride [$Ca(BH_4)_2$] would have utility for various purposes such, for example, as a source of hydrogen ($H_2$), especially in the field, and, among others, for the preparation of other boron compounds. Attempts to prepare calcium borohydride following procedures by which other borohydrides have been made have, however, been unsuccessful, and as far as I am aware calcium borohydride as described herein has not been made previously.

An object of the invention is to provide, as a new compound, calcium borohydride, $Ca(BH_4)_2$.

Another object is to provide a method of making calcium borohydride that is simple, efficient, easily practiced with readily available and inexpensive equipment, and yields product of high purity.

The invention is predicated in large part upon my discovery that calcium hydride ($CaH_2$) and diborane ($B_2H_6$) react readily to produce calcium borohydride in the presence of tetrahydrofuran ($C_4H_8O$).

In the practice of the invention calcium hydride is suspended in tetrahydrofuran in a closed reaction vessel and diborane is passed into the suspension, most suitably while stirring it. Suitable apparatus takes the form of a closed reactor provided with a stirrer, with means for introducing diborane, and with means for evacuating the vessel. Preferably the reactor is equipped likewise to permit distillation of the tetrahydrofuran or other solvent of the type stated above.

An appropriate amount of tetrahydrofuran is introduced into the reactor followed by the calcium hydride in relatively finely divided form. The amount of tetrahydrofuran is not critical but sufficient should be present to permit easy stirring. The reactor is closed and vacuum is applied to remove air present in it, after which the vacuum line is disconnected and diborane is passed in. The reaction proceeds readily at room temperature, with evolution of heat. The exact temperature is not critical and may be above or below room temperature but preferably the reactor is cooled to facilitate the absorption of the diborane. At the end of the run excess tetrahydrofuran is distilled off leaving a solid residue of calcium borohydride in the form of its mono tetrahydrofuranate [$Ca(BH_4)_2 \cdot C_4H_8O$].

Upon heating, most suitably under vacuum, the tetrahydrofuran is driven from the calcium borohydride tetrahydrofuranate leaving the $Ca(BH_4)_2$ as a white crystalline compound that does not melt at 300° C., is freely soluble in but reacts with water to liberate hydrogen somewhat more rapidly than is the case with sodium borohydride ($NaBH_4$). It is soluble in and likewise reacts with methanol ($CH_3OH$), but is only slightly soluble in ethyl ether ($Et_2O$).

As an example of the method of this invention, 10 gm. of calcium hydride and 200 cc. of tetrahydrofuran were placed in a 500 cc. round bottom flask provided with a magnetic stirrer and with a valved inlet. The flask was immersed in liquid nitrogen ($N_2$) to freeze its contents and in that condition it was evacuated to remove air from the frozen material and the space above it. Eleven liters of diborane (at N.T.P.) were introduced into a 35 liter evacuated steel tank isolated from the vacuum system by a valve. Diborane was withdrawn from the tank by freezing portions of it in a trap and then allowing the frozen diborane to warm up. When the vapor pressure of diborane exceeded that of the tetrahydrofuran in the flask, the diborane was admitted and stirring was started whereupon there was a noticeable absorption of diborane. After four portions of diborane had been thus admitted to the flask and the total pressure remained at approximately ⅔ of an atmosphere for several minutes, the excess diborane and tetrahydrofuran were distilled off. The flask was then filled with dry nitrogen and the residual solid was removed from the flask in a dry room. The calcium borohydride was extracted from the solid with tetrahydrofuran, the excess solvent was removed by distillation under vacuum and heat. The solid extract was heated at 65° C. for 15 hours; the product was a white solid which was shown by analysis to be calcium borohydride mono tetrahydrofuranate ($Ca(BH_4)_2 \cdot C_4H_8O$). On heating this material under vacuum for 2.5 hours at 155° C. a white solid remained which was shown by analysis to be 95.7 percent calcium borohydride.

Tetrahydrofuran is preferred because it is a solvent for calcium borohydride (or its mono tetrahydrofuranate) and seemingly thereby facilitates the reaction through solution of the calcium borohydride as rapidly as it is formed, thus insuring constant exposure of fresh calcium hydride surface for reaction with the diborane.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of making calcium borohydride comprising suspending, in a closed reactor, calcium hydride in tetrahydrofuran, removing air from the reactor, passing diborane into the reactor while stirring its contents, separating tetrahydrofuran from the reaction mixture, heating said reaction mixture to remove solvated tetrahydrofuran, and recovering calcium borohydride from the residue.

2. That method of making calcium borohydride comprising suspending, in a closed reactor, calcium hydride in tetrahydrofuran, freezing the mixture, evacuating the reactor to remove air, passing diborane into the reactor and stirring its contents, separating tetrahydrofuran from the reaction mixture, extracting the residual solid with a solvent, and recovering calcium borohydride from the extract.

3. That method of making calcium borohydride comprising suspending, in a closed reactor, calcium hydride in tetrahydrofuran, freezing the mixture, evacuating the reactor to remove air, passing diborane into the reactor and stirring its contents, then removing excess tetrahydrofuran by distillation, extracting the residual solid with tetrahydrofuran, recovering calcium borohydride from the extract as its mono tetrahydrofuranate, and heating the mono tetrahydrofuranate under vacuum to convert it to calcium borohydride.

References Cited by the Examiner

UNITED STATES PATENTS

| | | | |
|---|---|---|---|
| 2,545,633 | 3/1951 | Schlesinger et al. | 23—14 |
| 2,550,985 | 5/1951 | Finkolt | 23—204 |
| 2,729,540 | 1/1956 | Fisher | 23—14 |
| 2,737,447 | 3/1956 | Elliot | 23—204 |

OTHER REFERENCES

Hurd: Chemistry of the Hydrides, pages 44, 163 (1952). Published by John Wiley and Sons, New York.

Johnson et al.: Journal of the American Chemical Society, vol. 70, pages 3664–5 (1948).

Nystrom et al.: "Journal of the American Chemical Society," vol. 71, pages 3245–3246 (September 1949).

Wilber et al.: "Zeitschrift fur Naturforschung," volume 10b, pages 295–296 (1955).

Wilberg et al.: "Zeitschrift fur Naturforschung," volume 10, pages 292–294 (1955).

MAURICE A. BRINDISI, *Primary Examiner.*

WILLIAM G. WILES, BENJAMIN HENKIN,
*Examiners.*